Figure 1:
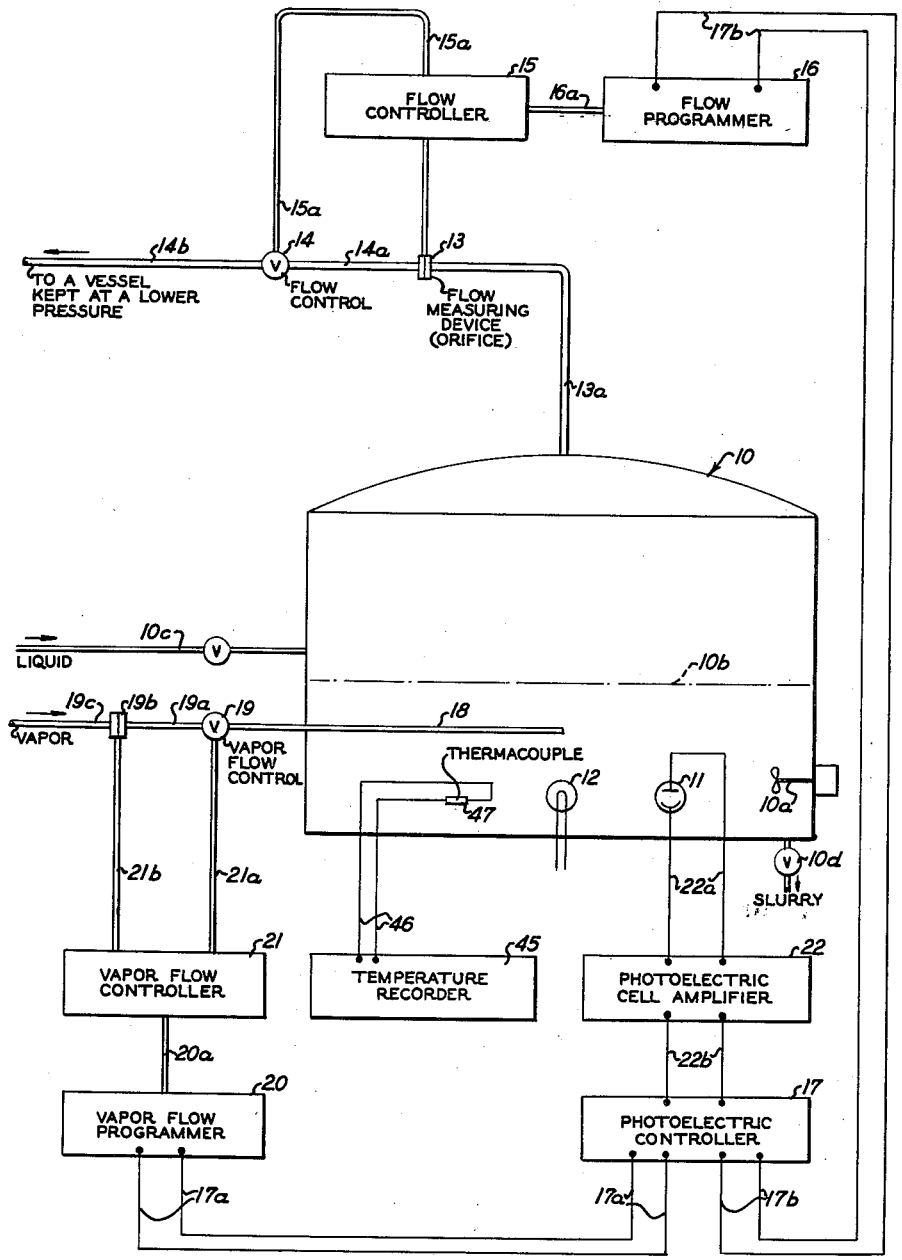

3,077,746
CRYSTALLIZATION PROCESS AND APPARATUS
Manfred Gans, Leonia, N.J., assignor to Scientific Design
Company, Inc., a corporation of Delaware
Filed Jan. 5, 1961, Ser. No. 80,834
7 Claims. (Cl. 62—58)

This invention relates to methods and means for the separation of one or more components from a liquid mixture thereof with at least one other material, more particularly to the solidification of such components followed by separation of the solid from the residual liquid, and especially to slowly cooling the liquid mixture to the point of incipient crystallization and then holding the crystallization conditions so that relatively large crystals or particles are formed. The incipient crystallization is detected by means of light passing through a part of the liquid mixture to photoelectric cell so connected with regulating means that when there is a sharp change in the current from the cell, the conditions in the system are substantially stabilized.

The crystallization of one or more components from their liquid mixtures with other materials is a desirable method for the separation of mixtures, the solid being separated from the residual liquid by filtration or equivalent means. In many crystallization processes, a relatively large number of fine or small crystals is formed and this renders subsequent separation extremely difficult or impractical. The art is confronted by the problem of providing methods and means for regulating crystallization or solidification of part of a liquid mixture so as to obtain the solid in a form which may be readily separated and recovered from the residual liquid.

The discoveries associated with the invention and relating to the solution of the above problems, and the objects achieved in accordance with the invention as set forth herein include the provision—

A method of regulating crystallization of a material from a liquid mixture which comprises cooling the solution down to an incipient crystallization temperature while passing light through a part of the solution to a photoelectric cell connected to control means for regulating the cooling, and holding the temperature at the incipient crystallization temperature by means of the substantial cessation of cooling when the light reaching the cell is greatly reduced;

Such a method wherein water is crystallized from saline water by cooling by evaporation of a low boiling liquid hydrocarbon mixed therewith optionally in a slow and pulsating manner and the cessation of cooling is by raising the pressure in the system so as greatly to reduce the rate of evaporation of the hydrocarbon;

Such a method wherein a small amount of steam is gradually introduced into the system to prevent supercooling;

Such a method wherein phthalic acids are crystallized out of an acetic acid solution by cooling by evaporation of acetic acid, and the cessation of cooling is by raising the pressure in the system so as greatly to reduce the rate of evaporation of the acetic acid;

An apparatus for crystallizing a solid from a liquid mixture including the combination of a vessel for holding the liquid mixture, means for reducing the pressure therein, means for regulating the rate of pressure reduction, means for passing light through a part of the mixture in the vessel, photoelectric cell means for receiving said light connected to the means for regulating the rate of pressure reduction;

Such an apparatus including means for introducing warming vapor into the vessel which means is also connected to the photoelectric cell means;

And other objects which will be apparent as details or embodiments of the invention are set forth hereinafter.

Figure 2:
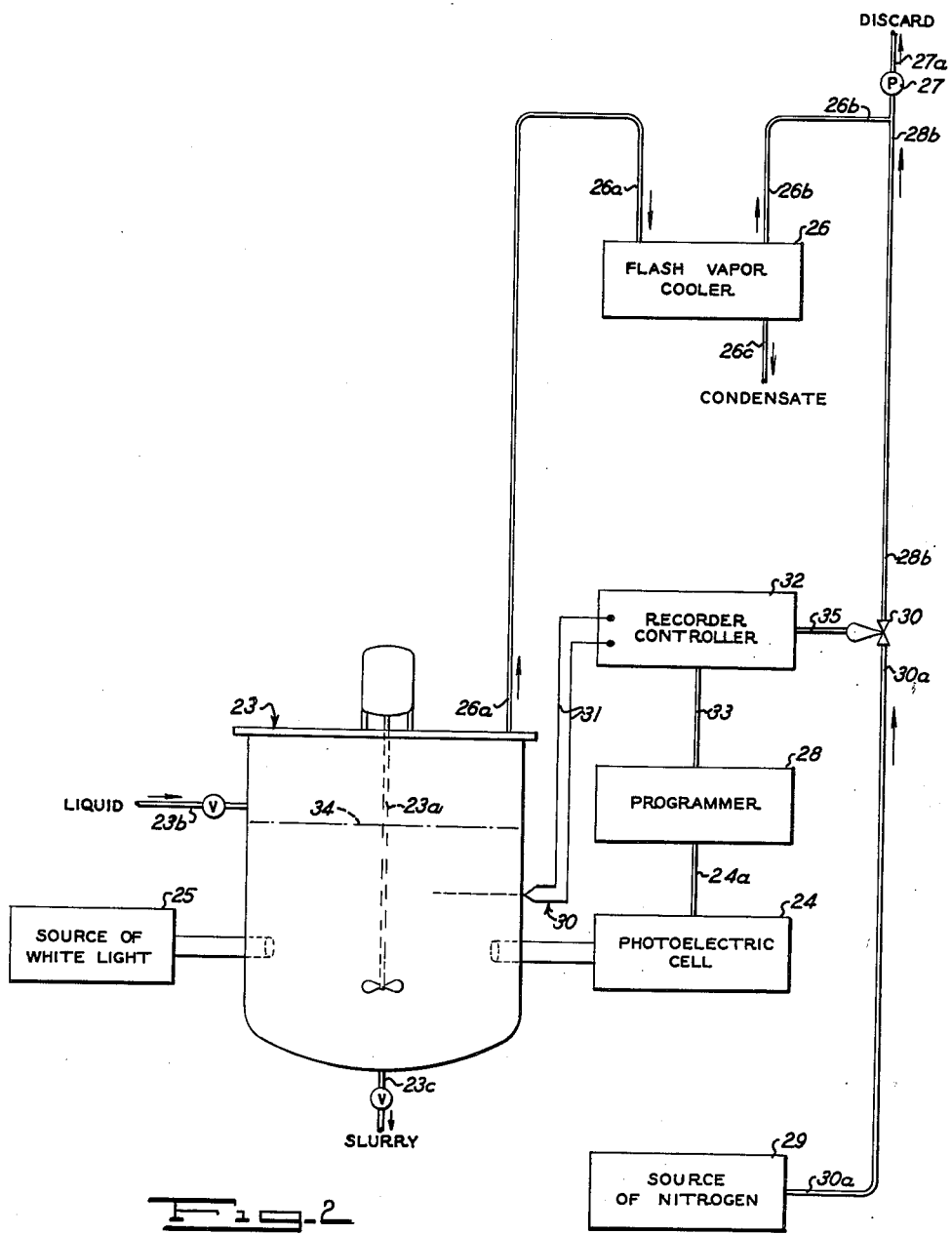

In the accompanying drawings, FIGURE 1 is a schematic illustration of a system for an embodiment of the invention, and FIGURE 2 is such an illustration for another embodiment thereof.

In order to indicate still more fully the nature of the present invention, the following examples of typical procedures are set forth in which parts and percents mean parts and percents by weights, respectively, it being understood that these examples are presented as illustrative only and they are not intended to limit the scope of the invention.

*Example 1*

Referring to FIGURE 1, about 100,000 lbs, of sea water containing an about equal volume of liquid hydrocarbon of high volatility, such as butane, precooled to a temperature of approximately 26.5° F., is introduced into a well insulated vessel 10, up to level 10b, via line 10c, and is agitated mildly by agitator unit 10a. The vessel is equipped with a photoelectric cell 11 of high sensitivity which "sees" a beam of white light, from source 12.

An overhead pipe 13a leads from the vessel to flow measuring device 13, and pipe 14a leads to an orifice control valve 14. Pipe 14b leads to a vessel kept at a pressure lower than the pressure in vessel 10.

The vessel 10 is also equipped with a vapor or steam inlet pipe 18 through which small amounts of steam can be admitted to the vessel from line 19c, orifice 19b, line 19a and valve 19.

After the vessel has been filled to level 10b with the sea water containing the hydrocarbon, vapor is allowed to escape through the control valve 14 and the temperature of the sea water is reduced thereby.

The amount of vapor which is allowed to escape is regulated by the programmer 16 acting via controller 15 on valve 14, and this is done in a pulsating or alternating manner (e.g. a fast rate, then a slow rate, then repeat the sequence).

On a day when the atmospheric temperature is 61° F., the programmer is set so that the flow from the vessel is as follows:

| Event | Cumulative Time in Minutes | Vapor Escape Rate (as measured by orifice 13) Actual Cubic Feet/Min. | Program Distribution |
|---|---|---|---|
| Vessel charged | 0 | 0 | Not in action. |
| Program Starts | 0-10 | 140.0 | Alternate: 140 a.c.f./min. for 30 secs., then 10.4 a.c.f./min. for 5 secs., then— |
| Program Continues | 10-13 | 75.0 | Alternate: 75 a.c.f./min. for 30 secs., then 10.4 a.c.f./min. for 20 secs., then— |
| Do | 13-16 | 40.0 | Alternate: 40 a.c.f./min. for 5 secs., then 10.4 a.c.f./min. for 4 secs., then— |
| Do | 16-20 | 20.0 | Alternate: 20 a.c.f./min. for 5 secs., then 10 a.c.f./min. for 4 secs., then— |
| Do | 20-24 | 15.0 | Alternate: 15 a.c.f./min. for 5 secs., then 10.4 a.c.f./min. for 5 secs., then— |
| Photoelectric Cell current change acts on Programmer. | 24 | 10.4 | Alternate: 10.4 a.c.f./min. continuous. |

When nucleation of water crystals occurs, the electric current flowing from the photoelectric cell through amplifier 22 and controller 17, and lines 22a and 22b, is greatly reduced. At this moment, controller 17 acts on programmer 20 via line 17a which in turn acts on flow controller 21 via line 20a, which controls valve 19 via line 21a so that a small amount of steam at the rate of 9 lbs./hr. for 30 seconds is admitted to the vessel from line 19c, orifice 19b (controlled via line 21b and connecting lines) in order to reduce the degree of supersaturation in the liquid.

Also, as the current from the photoelectric cell is reduced, the controller 17 acts via line 17b on programmer 16 which in turn acts on flow controller 15 which adjusts valve 14 via line 15a, so that 10.4 a.c.f./min. (actual cubic feet per minute) of vapor escape from the vessel via line 13a, orifice 13 and control valve 14. This small amount of vapor flow is set to compensate for any heat flow from the atmosphere into the vessel.

The whole operation is followed by the Wheatstone bridge type temperature recorder 45 including wires 46 and resistance element 47, or equivalent means which measures temperature with the desired accuracy.

Programmer 16 is preset so that during the low flow periods (10.4 a.c.f./min.) the temperature recorder 45 shows no drift over periods as long as one hour.

At this point, all conditions have been "frozen" and the seawater is kept at the optimum condition for the growth of large crystals.

After a suitable residence time, such as 30 minutes, the slurry is discharged from the vessel via line 10d and ice crystals are separated. Then the procedure is repeated. Lines 10c and 10d are provided with valves (not shown).

A suitable photoelectric cell for this purpose is manufactured by the General Electric Company and described in their bulletin GE Z-3005. A suitable amplifier and controller is described in the General Electric bulletin GE A-6887. Amplifier and controller are mounted in one housing in this unit, which also contains a recording device. A suitable combined programmer and controller is manufactured by the Minneapolis Honeywell Regulator Company (e.g., their model No. Y702P (11) M-93 (E) (38).

Example 2

Referring to FIGURE 2, a solution of phthalic acids in acetic acid containing impurities such as toluic acids and substituted benzaldehydes 34 is introduced into (via line 23b) and gradually cooled in vessel 23 while being gently agitated by agitator unit 23a. Photoelectric cell unit 24 "sees" a white light from a source 25. In this case, the cooling is achieved by flash evaporation of the acetic acid solvent (at reduced pressure) brought about by cooler 26, lines 26a and 26b, vacuum pump 27 and line 27a. Alternatively it may be achieved by a cooling coil (not shown). Condensate is removed via line 26c. The temperature in the vessel is followed by thermal element 30 which relays its signal to the recorder controller 32 via lines 31.

The rate of cooling is controlled by programmer 28 acting via a mechanical linkage 33 on the controller 32, which acts on valve 30b via instrument air line 35.

The programmer is preset so that the rate of cooling of the liquid 34 is 1° C./5 min.

As nucleation occurs, the photoelectric cell 24 detects a decrease in light intensity from light source 25. This results in a decrease in current through line 24a, the stopping of the programmer 28, and the activation of the recorder controller 32 which stops cooling. This allows the crystals to grow at the temperature of incipient nucleation. The recorder controller 32 stops cooling by opening control valve 30b thereby admitting nitrogen from source 29 via lines 30a and 28b into the system and by stopping the vacuum pump 27. The vessel is maintained at this temperature for twenty minutes and its temperature is then reduced by reducing the rate of flow of the nitrogen and reducing pressure at a slow rate so that more of the mixture of the phthalic acids comes out of solution. The photoelectric cell and controller as described in Example 1 are suitable for this application too.

After a suitable residue time such as one hour, the slurry is discharged via line 23c and the crystals are separated. Then the procedure is repeated. Lines 23b and 23c are provided with valves (not shown).

If a cooling coil is used, regulation of this cooling means is made in an analogous manner.

The foregoing procedures give relatively large crystals and substantially no unduly fine crystals or particles. The solid is readily separated from the liquid by filtration, centrifuging, or equivalent methods. The methods and systems of the invention are applicable to any liquid mixture from which one or more components may be solidified in the presence of residual liquid, e.g. by cooling or the like methods to bring the system to saturation or to a concentration somewhat above saturation of the component in question. The cooling or the like treatment is carried on until incipient solidification or crystallization occurs, and then the conditions are maintained constant in order to facilitate further growth of crystals already formed with minimal formation of additional crystals. In this way crystals or particles are formed and troublesome fines or small particles are minimized or avoided.

In view of the foregoing disclosures, variations and modifications thereof will be apparent to one skilled in the art, and it is intended to include within the invention all such variations and modifications except as do not come within the scope of the appended claims.

What is claimed is:

1. A method of regulating crystallization of a material from a liquid mixture which comprises cooling the solution down to an incipient crystallization temperature while passing light through a part of the solution to a photoelectric cell connected to control means for regulating the cooling and holding the temperature at the incipient crystallization temperature by means of the substantial cessation of cooling when the light reaching the cell is greatly reduced.

2. A method of claim 1 wherein water is crystallized from saline water by cooling by evaporation of a low boiling liquid hydrocarbon mixed therewith, and the cessation of cooling is by raising the pressure in the system so as greatly to reduce the rate of evaporation of the hydrocarbon.

3. A method of claim 2 wherein a small amount of steam is gradually introduced into the system to prevent supercooling.

4. A method of claim 2 wherein the cooling is conducted in a pulsating manner.

5. A method of claim 1 wherein phthalic acids are crystallized out of an acetic acid solution by cooling by evaporation acetic acid, and the cessation of cooling is by raising the pressure in the system so as greatly to reduce the rate of evaporation of the acetic acid.

6. An apparatus for the controlled crystallization of a solid from a liquid mixture which comprises: a vessel containing said liquid mixture; means for introducing a low boiling liquid hydrocarbon into said mixture, the evaporation of said liquid hydrocarbon being responsive to the pressure in said vessel and serving to cool and form crystals in said mixture; means for regulating the pressure in said vessel; a light source adapted to pass light through said liquid mixture; a photoelectric cell adapted to detect a decrease of light from said light source due to the formation of crystals, and further adapted to actuate said pressure regulating means, thereby controlling the rate of said crystallization.

7. An apparatus of claim 6 including means for introducing warming vapor into the vessel which means is also connected to the photoelectric cell.

(References on following page)

References Cited in the file of this patent

UNITED STATES PATENTS

| | | | |
|---|---|---|---|
| 2,377,926 | Dreier | June 12, 1945 |
| 2,448,403 | Turner | Aug. 31, 1948 |
| 2,821,304 | Zarchin | Jan. 28, 1958 |
| 2,904,511 | Donath | Sept. 15, 1959 |
| 2,990,339 | Frank et al. | June 27, 1961 |

FOREIGN PATENTS

| | | |
|---|---|---|
| 70,507 | Norway | June 3, 1946 |